(12) United States Patent
Zhang et al.

(10) Patent No.: US 7,647,459 B2
(45) Date of Patent: Jan. 12, 2010

(54) MULTI-STREAM ACCESS SCHEME FOR HIGH SPEED ACCESS AND RECORDING USING A HARD DISK DRIVE

(75) Inventors: Weimin Zhang, San Jose, CA (US); Tony Francesca, Pleasanton, CA (US)

(73) Assignee: BroadLogic Network Technologies, Inc., San Jose, CA (US)

( * ) Notice: Subject to any disclaimer, the term of this patent is extended or adjusted under 35 U.S.C. 154(b) by 0 days.

(21) Appl. No.: 10/305,260

(22) Filed: Nov. 25, 2002

(65) Prior Publication Data

US 2003/0131191 A1    Jul. 10, 2003

Related U.S. Application Data

(60) Provisional application No. 60/333,695, filed on Nov. 26, 2001, provisional application No. 60/333,963, filed on Nov. 27, 2001.

(51) Int. Cl.
| | |
|---|---|
| G06F 12/00 | (2006.01) |
| G06F 13/00 | (2006.01) |
| G06F 13/28 | (2006.01) |
| H04N 7/173 | (2006.01) |
| G11B 3/64 | (2006.01) |
| H04N 5/00 | (2006.01) |

(52) U.S. Cl. .................. 711/161; 711/150; 711/154; 711/165; 725/92; 725/93; 369/84; 386/125

(58) Field of Classification Search ............ 711/113, 711/112; 710/53, 57, 21, 112; 709/231
See application file for complete search history.

(56) References Cited

U.S. PATENT DOCUMENTS

| | | | | |
|---|---|---|---|---|
| 5,559,952 A | * | 9/1996 | Fujimoto | 345/557 |
| 5,572,691 A | * | 11/1996 | Koudmani | 711/5 |
| 6,185,621 B1 | * | 2/2001 | Romine | 709/231 |
| 6,345,028 B1 | * | 2/2002 | Jaeger | 369/84 |
| 6,438,630 B1 | * | 8/2002 | DeMoney | 710/56 |
| 2002/0057893 A1 | * | 5/2002 | Wood et al. | 386/46 |
| 2003/0002864 A1 | * | 1/2003 | Mollie et al. | 386/125 |
| 2004/0057697 A1 | * | 3/2004 | Renzi et al. | 386/83 |
| 2005/0031319 A1 | * | 2/2005 | Fujita et al. | 386/125 |

FOREIGN PATENT DOCUMENTS

| | | | |
|---|---|---|---|
| JP | 10-063432 | * | 3/1998 |
| JP | 10-234007 | * | 9/1998 |

* cited by examiner

*Primary Examiner*—Christian P Chace
*Assistant Examiner*—Ryan Bertram
(74) *Attorney, Agent, or Firm*—Townsend and Townsend and Crew LLP

(57) ABSTRACT

A system for high-speed access and recording includes a demodulator, a buffer memory, and a hard disk. During a write cycle, a content stream is stored in buffer memory and thereafter transferred to the demodulator. When the buffer memory reaches its storage capacity, its contents are transferred to the hard disk for storage. During a read cycle, contents from the hard disk are read and then stored in the buffer memory. The hard disk further includes includes a high-speed zone and a random-access zone, which are configured to operate in a high-speed mode, a random-access mode, and a buffer-cleaning mode.

46 Claims, 7 Drawing Sheets

| Stream 1 Buffer A  152(1A) | Stream 2 Buffer A  152(2A) | Stream 3 Buffer A  152(3A) | Stream n Buffer A  152(nA) |
|---|---|---|---|
| Stream 1 Buffer B  152(1B) | Stream 2 Buffer B  152(2B) | Stream 3 Buffer B  152(3B) | Stream n Buffer B  152(nB) |

MULTI-STREAM ACCESS SCHEME FOR HIGH SPEED ACCESS AND RECORDING USING A HARD DISK DRIVE

CROSS-REFERENCES TO RELATED APPLICATIONS

The present application claims the benefit of priority under 35 U.S.C. § 119 from U.S. Provisional Patent Application Ser. No. 60/333,695, entitled "MULTI-STREAM ACCESS SCHEME FOR HIGH-SPEED RECORDING USING A HARD DISK DRIVE" filed on Nov. 26, 2001, and U.S. Provisional Patent Application Ser. No. 60/333,963, entitled "MULTI-STREAM ACCESS SCHEME FOR HIGH-SPEED RECORDING USING A HARD DISK DRIVE" filed on Nov. 27, 2001, the disclosures of which are hereby incorporated by reference in its entirety for all purposes.

BACKGROUND OF THE INVENTION

The present invention relates generally to storage systems, and more particularly to method and circuitry for implementing multi-stream high-speed data access and recording in a storage system.

FIG. 1 is a simplified schematic diagram of a conventional hard disk. A controller 102 moves a disk head 104 across the surface of a hard disk 106. The hard disk 106 is divided into annular tracks 108. Each track 108 is divided into contiguous sectors 110. Each track 108 can hold a large number of sectors 110. In a conventional construction, one sector 110 typically holds five hundred and twelve (512) bytes of data. Hard disks holding twenty (20) or more Gbits are common. Different types of data or content program information can be stored on a hard disk including, for example, audio, video, data, etc. A content program, such as a movie of DVD quality, is generally made up of one or more files. Each file is further broken into byte groups. Each byte group is stored in a sector.

FIG. 2 is a simplified schematic diagram showing memory allocation of a conventional hard disk file system. During write cycles, sectors 110 are randomly accessed depending on which sectors are available. Available sectors are randomly located around the hard disk. Sectors 110 of FIG. 2 are further characterized as available blocks 112 and filled blocks 114. As shown in FIG. 2, the available blocks 112 and the filled blocks 114 are not necessarily stored in a contiguous manner, i.e., some filled blocks 114 may be situated between available blocks 112 and vice versa.

Conventional random allocation of sectors is typically preferred because such allocation enables a hard disk to be used to its full capacity. During a write cycle, each byte group is placed into an available or target sector. The available sector can come from any location on the hard disk. Sectors from any part of the hard disk can become available, and thereafter are subject to being rewritten. Before a byte group is placed into the target sector, the disk head (not shown) must first identify and then move to the target sector. While the positioning of the disk head over the target sector might require long head movements, this approach utilizes the hard disk to its fullest capacity. Once the disk head is positioned over the target sector, the actual writing of the byte group to that target sector can be very fast, e.g., greater than fifty (50) MB/sec. The time it takes for the disk head to position over the target sector, however, can take a relatively substantial amount of time, e.g., 10-40 msec. This is because the available sectors for writing are randomly located on the hard disk. Consequently, the available sectors need to be initially identified or searched which adds to the access time in both write and read cycles.

Due to the need to search for the available sectors, access times may vary depending on how far the disk head must travel across the hard disk. For example, if the disk head must travel from one sector to another and both sectors are in relatively close proximity, the access time might be relatively fast, e.g., 10 ms. If, however, the disk head is originally positioned towards the outer edge of the hard disk and must then travel towards the center of the hard disk, then the access time can be relatively slow, e.g., 40 ms. Thus, the range of access times may also vary depending on the size of the hard disk, and will likely increase with larger hard disks.

Furthermore, excessively long access time may cause loss of data when read and write cycles are alternated. Due to multi-tasking, a conventional system almost always has to alternate between read and write cycles. Alternating between read and write cycles can occur in a number of different situations including, for example, when a user who is recording and viewing a content program, such as a movie, stops viewing the movie temporarily and returns to viewing from where the user left off. Recording of the movie, however, continues despite the temporary viewing stoppage. In this situation, since there is only one disk head in the system, the disk head has to be moved around alternately to retrieve the next block of data for display to the user and then search for the next available sectors for storing data on the hard disk. If the access time for the read cycle becomes intolerably long, then the resulting disruption in the viewing of the movie may become noticeable to the user. Likewise, if the access time for the write cycle is too slow, information can be lost because the disk head may stop writing in order to initiate the next read cycle to read data that is needed for display to the user.

A number of statistical models have been used to measure the average fallout of conventional systems, i.e., the amount of information lost. The average fallout increases when multiple streams of information are received. For example, two tuners might be employed to receive two information streams from two different sources. In this situation, the disk head may be limited by its own speed and may not be able to handle write cycles in a sufficiently fast manner to allow both information streams to be recorded.

Hence, it would be desirable to provide a storage system that is able to handle multi-stream data access and recording in a more efficient manner so as to improve system performance and minimize loss of data.

BRIEF SUMMARY OF THE INVENTION

A system for facilitating high-speed access and recording is provided. In one exemplary embodiment, the system includes a demodulator, a buffer memory and a hard disk. During a write cycle, the demodulator is used to receive one or more content streams. The content streams received by the demodulator are first stored in the buffer memory. When the buffer memory has reached its storage capacity, its contents are then transferred to the hard disk for storage. During a read cycle, contents from the hard disk are read and then stored in the buffer memory. Other components of the system can then access the read-out contents from the buffer memory. The amount of contents retrieved from the hard disk and stored in the buffer memory may be more than what is requested depending on the application requesting the contents.

In one exemplary embodiment, the buffer memory is made up of a number of service units. Two service units are assigned to each content stream, one for the read operation and the other for the write operation. Each service unit further includes a pair of sub-units. For the write operation, the sub-units are alternately filled with the content stream and emptied onto the hard disk.

In one exemplary embodiment, the hard disk further includes different zones. There are two types of zones, namely, high-speed zone and random-access zone. The two different types of zones allow for a number of operating modes, namely, the high-speed mode, the random-access mode and the buffer-cleaning mode. In the high-speed mode, contents from the buffer memory are transferred to the high-speed zone in a continuous manner regardless of the nature or classification of the contents. In the random-access mode, contents from the buffer memory are respectively transferred to the appropriate locations in the random-access zone based on the nature or classification of the contents. In the buffer-cleaning mode, contents stored in the high-speed zone are transferred to appropriate locations in the random-access zone based on the nature or classification of the contents.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 4 is a simplified schematic diagram of a buffer memory according to one exemplary embodiment of the present invention;

DETAILED DESCRIPTION OF THE INVENTION

Figure 1:
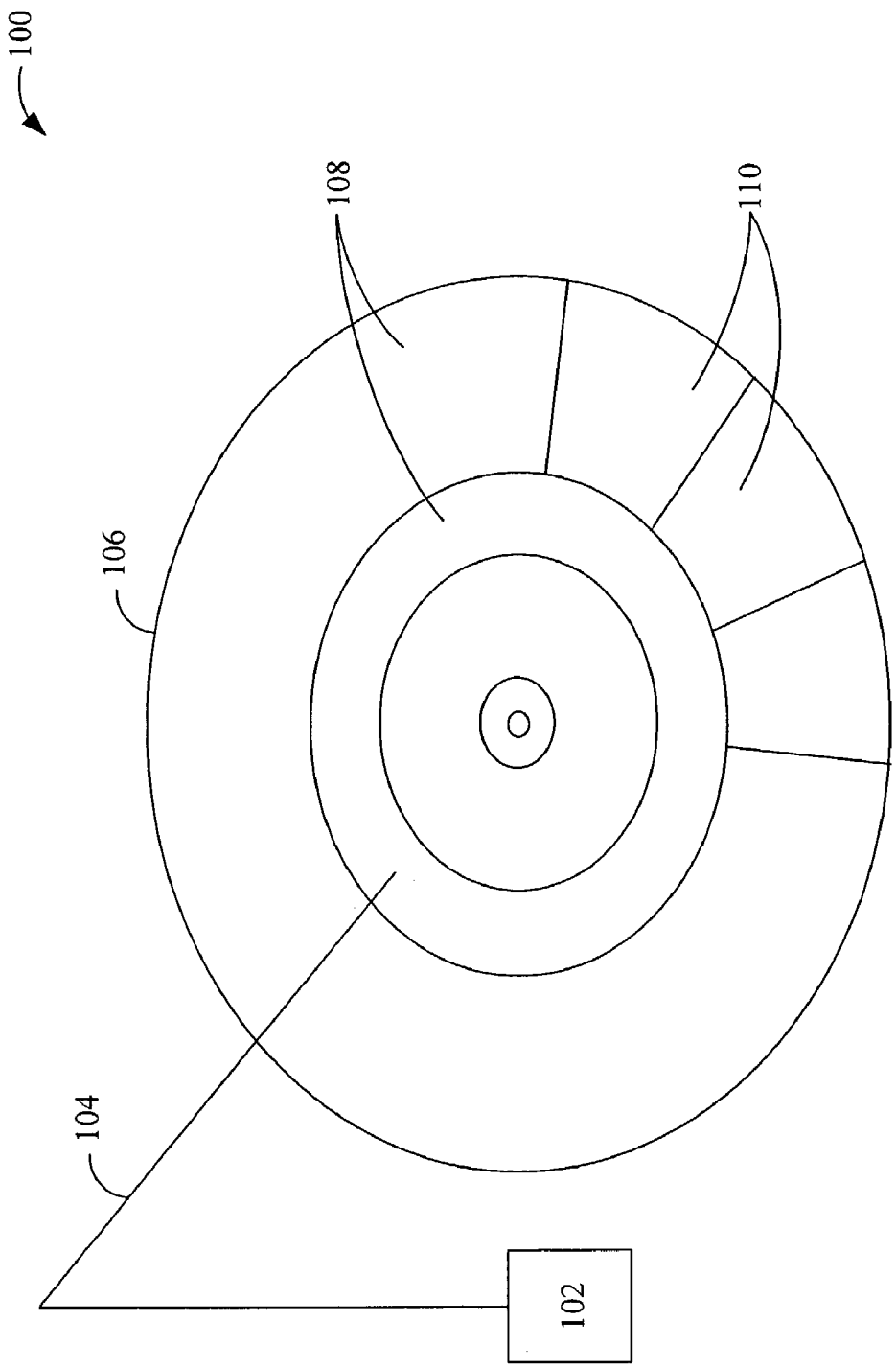
FIG. 1 is a simplified schematic diagram of a conventional hard disk.
Figure 2:
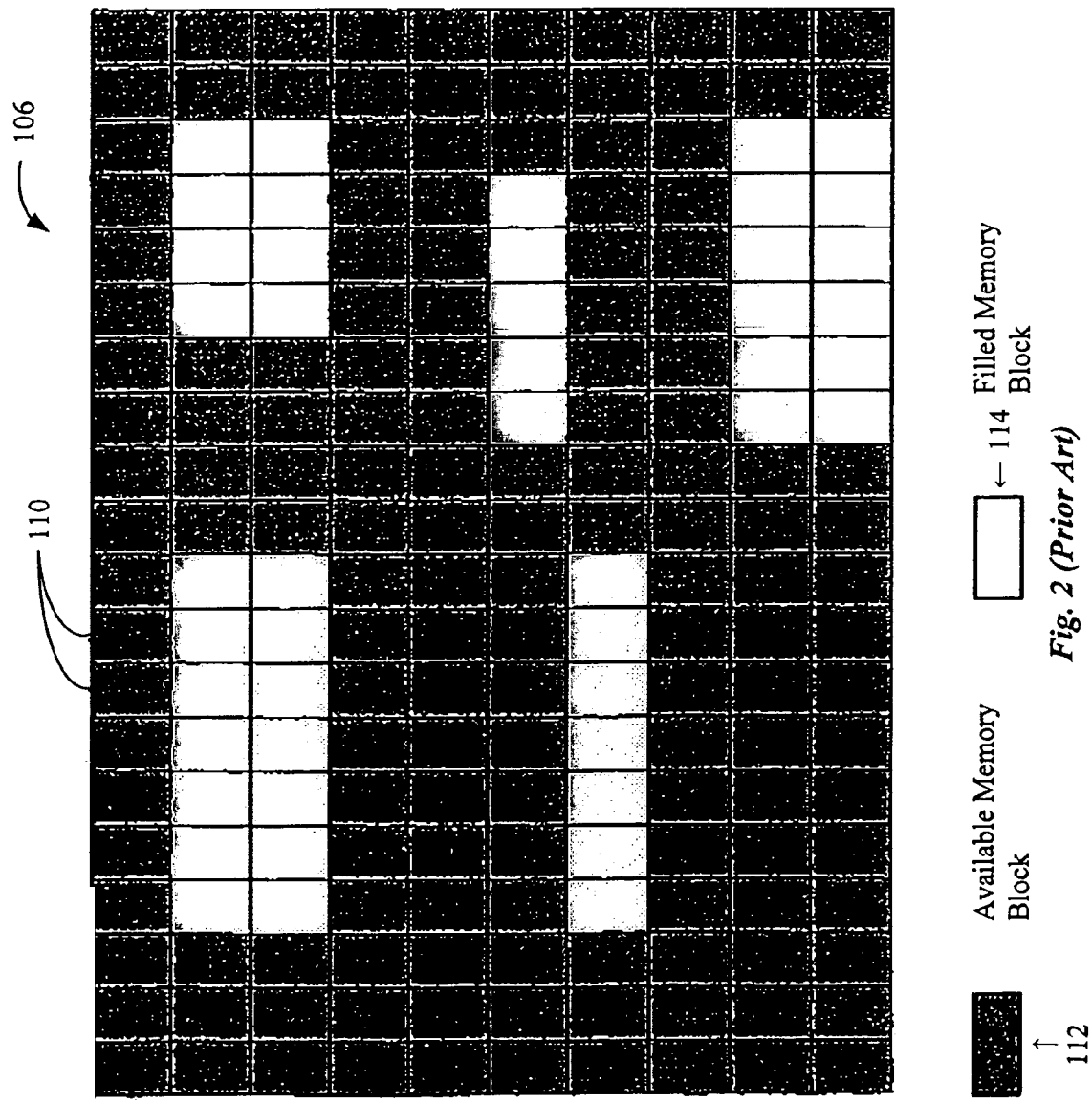
FIG. 2 is a simplified schematic diagram illustrating memory allocation of a conventional hard disk file system.
Figure 3:
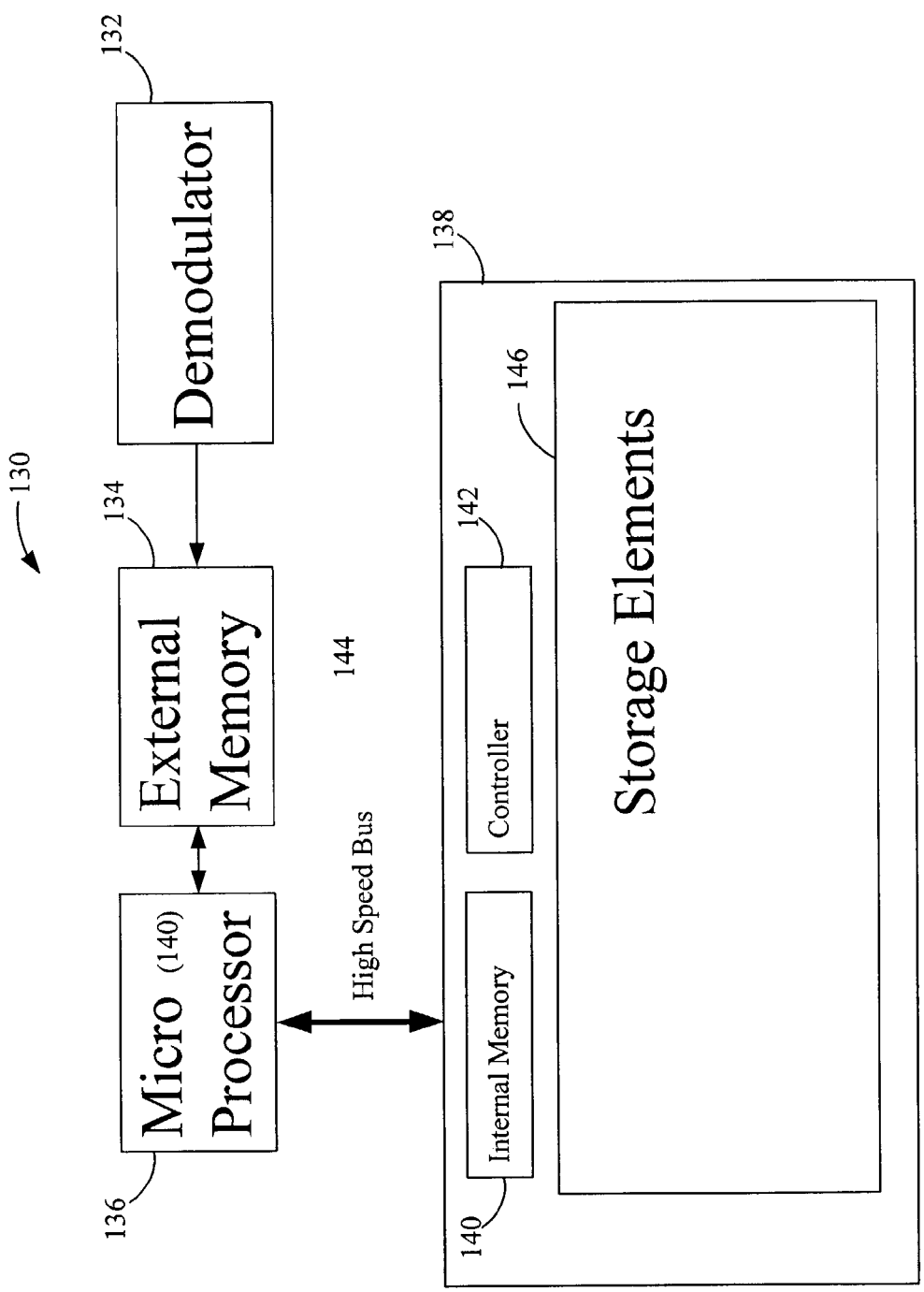
FIG. 3 is a simplified block diagram of a multi-stream access system according to one exemplary embodiment of the present invention.

The present invention in the form of one or more exemplary embodiments will now be described. FIG. 3 is a simplified block diagram of a multi-stream access and recording system 130 according to one exemplary embodiment of the present invention. In an exemplary embodiment, the multi-stream access and recording system 130 includes a number of demodulators 132, a buffer memory 134, a microprocessor 136 and a hard disk 138. The hard disk 138 can be a standard hard disk that is readily available commercially. It should be understood that the hard disk 138 is described herein for illustrative purposes only and that a person of ordinary skill in the art will know how to apply the present invention other types of storage media. The hard disk 138 further includes an internal memory 140, a controller 142 and a number of storage elements 146. The hard disk 138 and the microprocessor 136 are connected via a high speed data bus 144. The demodulators 132 are used to respectively receive data or contents from multiple content streams. Each incoming content stream can have a different data rate. The number of content streams coming into the demodulators 132 may vary depending on the specific design and/or application. Data or contents from the content streams received by the demodulators 132 are then input and stored in the buffer memory 134.

The demodulators 132 can be implemented in a number of ways. In one exemplary implementation, a single demodulator is used to receive one content stream or channel. In an alternative exemplary implementation, a single demodulator is able to handle multiple content streams or channels. An example of a multi-channel demodulator is described in co-owned and co-pending non-provisional U.S. patent application Ser. No. 09/956,479, filed on Sep. 18, 2001, entitled "A Digital Implementation of Multi-Channel Demodulators," which is hereby incorporated by reference for all purposes.

Furthermore, it should be noted that in alternative embodiments, other types of data receivers can be used in place of the demodulators 132. A person of ordinary skill in the art will know how to use other types of data receivers in the present invention.

The buffer memory 134 functions as a data buffer zone for high-speed data access and recording. As will be further described below, the buffer memory 134 is capable of receiving data from both the demodulators 132 and the storage medium 138, depending on which operating mode is active. The buffer memory 134 can be either internal or external to the hard disk 138. The buffer memory 134 can be any of a number of commonly available storage media. The capacity of the buffer memory 134 may vary depending on the specific design and/or application. Based on the disclosure and teachings provided herein, a person of ordinary skill in the art will appreciate how to implement the buffer memory 134 and determine its capacity.

In one exemplary embodiment, the multi-stream access and recording system 130 can operate in two operating modes, namely, a write mode and a read mode. During the write mode, the buffer memory 134 first receives from the demodulators 132 data or contents corresponding to one or more content streams. It should be understood that, for ease of description, the content streams are meant to include their corresponding data or contents. The content streams are initially stored in the buffer memory 134 until certain predetermined conditions are met. Such conditions include, for example, the buffer memory 134 reaching a predetermined capacity threshold and a temporary holding period expiring. When the predetermined conditions are met, the microprocessor 136 sends the contents of the buffer memory 134 across the high-speed bus 142 to the hard disk 138, more specifically, the internal memory 140 associated with the hard disk 138. The controller 142 then directs the internal memory 140 to forward its contents to the storage elements 146 within the hard disk 138 for storage purposes. By storing the content streams into the buffer memory 134 first, a larger amount data is written to the hard disk 138 each time the disk head (not shown) of the hard disk 138 is positioned to record. Consequently, movement relating to the disk head of the hard disk 138 is reduced.

During the read mode, data is retrieved from the hard disk 138 pursuant to an access request and the data is then stored in the buffer memory 134. The amount of data to be retrieved and stored in the buffer memory 134 varies depending on the application utilizing the data. A predictive algorithm or method can be used to determine how much data is to be retrieved and stored in the buffer memory 134. The amount of data retrieved is more than the amount requested by the access request. The additional data is retrieved in anticipation of a subsequent access request. Data stored in the buffer memory 134 can then be accessed or read by other components of the system. For example, if the data represents a movie and the movie is being viewed by a user, a certain amount of data can be retrieved and stored in the buffer memory 134 ahead of time before such data is needed for viewing; in another example, if the user fast-forwards a movie, additional data is retrieved and stored in the buffer memory 134 in anticipation of subsequent access requests to be issued in connection with the fast-forward function. The amount of data to be retrieved and stored in the buffer memory 134 depends on the specific design and/or application. By storing data into the buffer memory 134 before it is needed, a larger amount of data is retrieved from the hard disk 138 each time the disk head of the hard disk 138 is positioned to read from the hard disk 138 and movement relating to the disk head of the hard disk 138 is also reduced.

FIG. 4 is a simplified schematic diagram of one exemplary embodiment of the buffer memory 134. In this exemplary embodiment, the buffer memory 134 is divided into a number of service units 152(1 . . . n). It should be noted that "n" is an arbitrary number that is selected based on a specific design and/or application. Preferably, the size of the service units 152(1 . . . n) are roughly the same. In other embodiments, the size of each service unit 152 may vary depending on the specific design and/or application.

In one exemplary embodiment, two service units are allocated for each content stream, one for use in the write mode and one for use in the read mode. With two service units, continuous and concurrent read and write operations can be performed on the content stream. In other embodiments, one service unit can be assigned to one content stream; alternatively, more than two service units can be allocated to one content stream. When multiple service units are assigned to one content stream, the service units are used in a sequential order to receive the content stream. For example, the service units are filled one after another with data from the content stream. The number of service units assigned to each content stream may vary depending on the specific design and/or application.

In one exemplary embodiment, each service unit is further partitioned into two sub-units designated "A" and "B" with a pair of sub-units being referred to as a "ping-pong buffer unit". For example, service unit 152(1) is divided into sub-units 152(1A) and 152(1B) Within each ping-pong buffer unit, either sub-unit A or sub-unit B is filled first to a predetermined capacity threshold and then followed by the other.

During the write mode, sub-unit A, for example, is filled with a content stream first. Once sub-unit A is filled up to its predetermined capacity threshold, the content stream is directed to flow into sub-unit B. While sub-unit B is being filled, the contents in sub-unit A are sent to the hard disk 138 for storage, as described above. When sub-unit B is filled up to its predetermined capacity threshold, the content stream is redirected to flow into the now available sub-unit A and contents in sub-unit B is transferred and stored onto the hard disk 138. Sub-units A and B are filled and their contents transferred onto the hard disk 138 in this alternating manner. The transfer rates from sub-units A and B to the hard disk 138 need not be, but they preferably are, the same and the rates are sufficiently fast such that data can continuously stream through the ping-pong buffer. In other embodiments, each service unit 152 could be divided into more than two sub-units. For example, one alternative embodiment can include sub-units A, B, and C. Similarly, the multiple sub-units A, B and C are sequentially filled to their respective predetermined capacity threshold and the contents of each sub-unit are stored onto the hard disk 138 once that sub-unit is filled.

Figure 5:
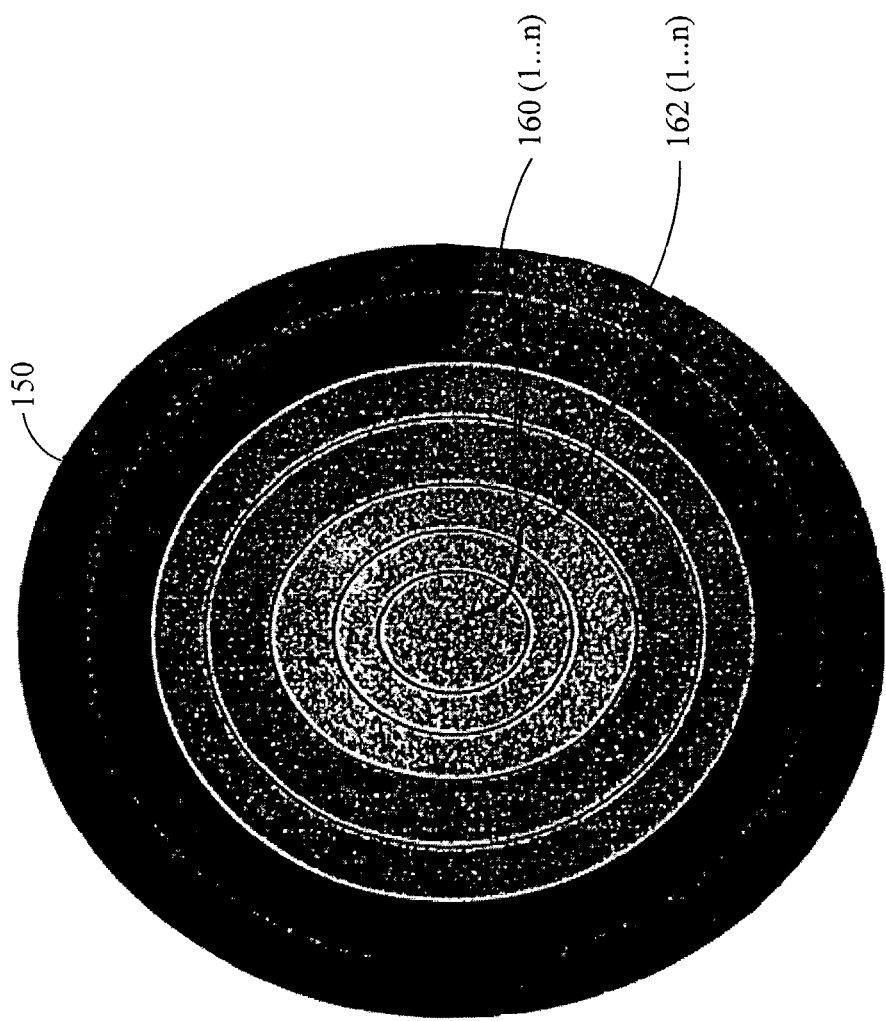
FIG. 5 is a simplified schematic diagram of a hard disk according to one exemplary embodiment of the present invention.

FIG. 5 is a simplified schematic diagram of one exemplary embodiment of a hard disk 150 designed for high-speed multiple-stream access and recording according to the present invention. In this specific embodiment, the hard disk 150 is partitioned into different zones. Each zone can be used in both write and read modes. Furthermore, at least one zone is dedicated to "high-speed" recording, as will be further described below.

In an exemplary embodiment, the hard disk 150 includes one or more high-speed zones 160(1 . . . n) and one or more random-access zones 162(1 . . . n). It should be noted that "n" is an arbitrary number selected based on a specific design and/or application. It should also be noted that the number of high-speed zones 160 and the number of random-access zones 162 do not necessarily have to be the same. The exact number of zones and the specific function of each zone may vary depending on the specific design and/or application. In some embodiments, each zone can serve a special function. For example, one random-access zone 162(1) can be dedicated for storing large video files; and another random-access zone 162(2) can be dedicated for small data files. The precise size, location, and function of each zone may vary depending on the specific design and/or application. Each zone is partitioned into a number of zone units (not shown), and each zone unit is partitioned into sectors. The actual sizes of the zone units and their configurations may vary depending on the specific design and/or application. In some embodiments, a zone can be further divided into sub-zones. For example, a random-access zone 162 can be divided into specialized sub-zones for storing video data, audio data and other types of data respectively.

The hard disk 138 with its different zones allows for a number of operating modes. In an exemplary embodiment, the operating modes include a high-speed mode, a random-access mode and a buffer-cleaning mode. Based on the disclosure and teachings provided herein, it should be understood that other types of operating modes can be implemented depending on the zones available in the associated storage medium.

In the high-speed mode, two types of operations, namely, write and read cycles, can be performed. The write and read cycles are asynchronous and are independent of each other. In the write cycle, content streams being recorded onto the hard disk 138 are initially stored in the high-speed zone 160 regardless of the type of data contained within the content streams. As noted above, the content streams are transferred from the buffer memory 134. Content streams are recorded to the high-speed zone 160 continuously. That is, zone units within the high-speed zone 160 are filled sequentially one after another. The size of each zone unit is preferably (although not necessarily) fixed and the exact size of each zone unit depends on the specific design and/or application. In some embodiments, the zone unit being filled is contiguous to the previously filled zone unit. While consecutively filled zone units need not be contiguous, the recording rate is improved if such zone units are contiguous because no search is required to locate the next available zone units. If a read cycle is introduced while recording, the position of the last or most recently filled zone unit is recorded. When the read cycle is completed, the subsequent write cycle can then swiftly locate the recorded position to continue where it left off without a search.

By storing the content streams in the high-speed zone 160 in this manner, the access time for a read cycle is reduced.

Each read cycle requires only one search to locate the sector containing the initial position of the target data. Once the initial position is located, due to the close proximity of the zone units, the access time is decreased when the target data is read from the high-speed zone 160.

The use of the high-speed zone 160 as described above offers a number of advantages and/or benefits. For example, the use of the high-speed zone 160 is particularly advantageous when there is asymmetric access. Asymmetric access refers to a situation in which there is substantially more data recording onto the hard disk 138 than data retrieval from the hard disk 138, such as, where a user uses a personal video recording (PVR) system to download and record large video files for subsequent viewing. With the high-speed zone 160, the video files are stored in close proximity to one another thereby allowing more efficient subsequent access. In addition, the use of the high-speed zone 160 allows a system to improve its throughput capacity by storing data onto a storage medium more swiftly.

In an exemplary embodiment, the content streams are stored in the high-speed zone 160 on a temporary basis. After a predetermined period of time or when certain conditions are met, contents from the high-speed zone 160 are transferred to the random-access zone 162. The content transfer from the high-speed zone 160 to the random-access zone 162 will be further described below.

In the random-access mode, content streams are stored directly onto the random-access zones 162(1 . . . n). Similarly, content streams are transferred from buffer memory 134 directly to the random-access zones 162(1 . . . n). The random-access zones 162(1 . . . n) can be organized in a number of different ways based on various criteria. For example, the random-access zones 162(1 . . . n) can be organized based on the type of data that such zones are supposed to contain, such as, video data, audio data and text data. Furthermore, as mentioned above, a random-access zone 162 can be further divided into specialized sub-zones. Such sub-zones can also be organized based on additional criteria. Based on the disclosure and teachings provided herein, a person of ordinary skill in the art will know of the various different ways and/or methods to organize the random-access zones in accordance with the present invention.

When content streams are processed in the random-access mode, they are stored onto respective random-access zones 162(1 . . . n) or sub-zones. For example, data from a movie can be stored in a random-access zone that is classified for storing video files and further in a sub-zone under that random-access zone that is classified for storing video files for movies. The random-access mode is engaged typically when access capacity of a system is sufficiently met to allow content streams to be stored in more specific locations on the hard disk 138. Also, as mentioned above, contents from the high-speed zone 160 can be transferred into the random-access zones 162. Such transfer is effected under the buffer-cleaning mode, as will be further described below.

In the buffer-cleaning mode, the hard disk 138 is defragmented to provide access and recording optimization. In effect, the system "cleans" the data or contents from the high-speed zone 160. More specifically, data is transferred from the high-speed zone 160 to the random-access zone 162 for future read cycles. The transfer can be triggered manually or on an automated basis after a specified time period has expired or when certain conditions are met. For example, in some embodiments, the buffer-cleaning mode is engaged when no content streams are being recorded. As described above, the random-access zone 162 can be organized based on different criteria and can be further divided into specialized sub-zones. Consequently, in the buffer-cleaning mode, content streams from the high-speed zone 160 are first examined accordingly based on the criteria used in organizing the random-access zones 162 and their corresponding sub-zones, if any, and then depending on the results of the examination the content streams are respectively transferred to the appropriate locations in the random-access zones 162. In addition, in the buffer-cleaning mode, a number of maintenance services are performed on the contents of the random-access zones 162. For example, contents of a random-access zone 162 can be defragmented to provide better content organization, access optimization and space utilization. Organizing and storing data into random-access zones 162 reduces access times for future read cycles. Accordingly, as hard drives increase in size, access times can be minimized.

Figure 6:
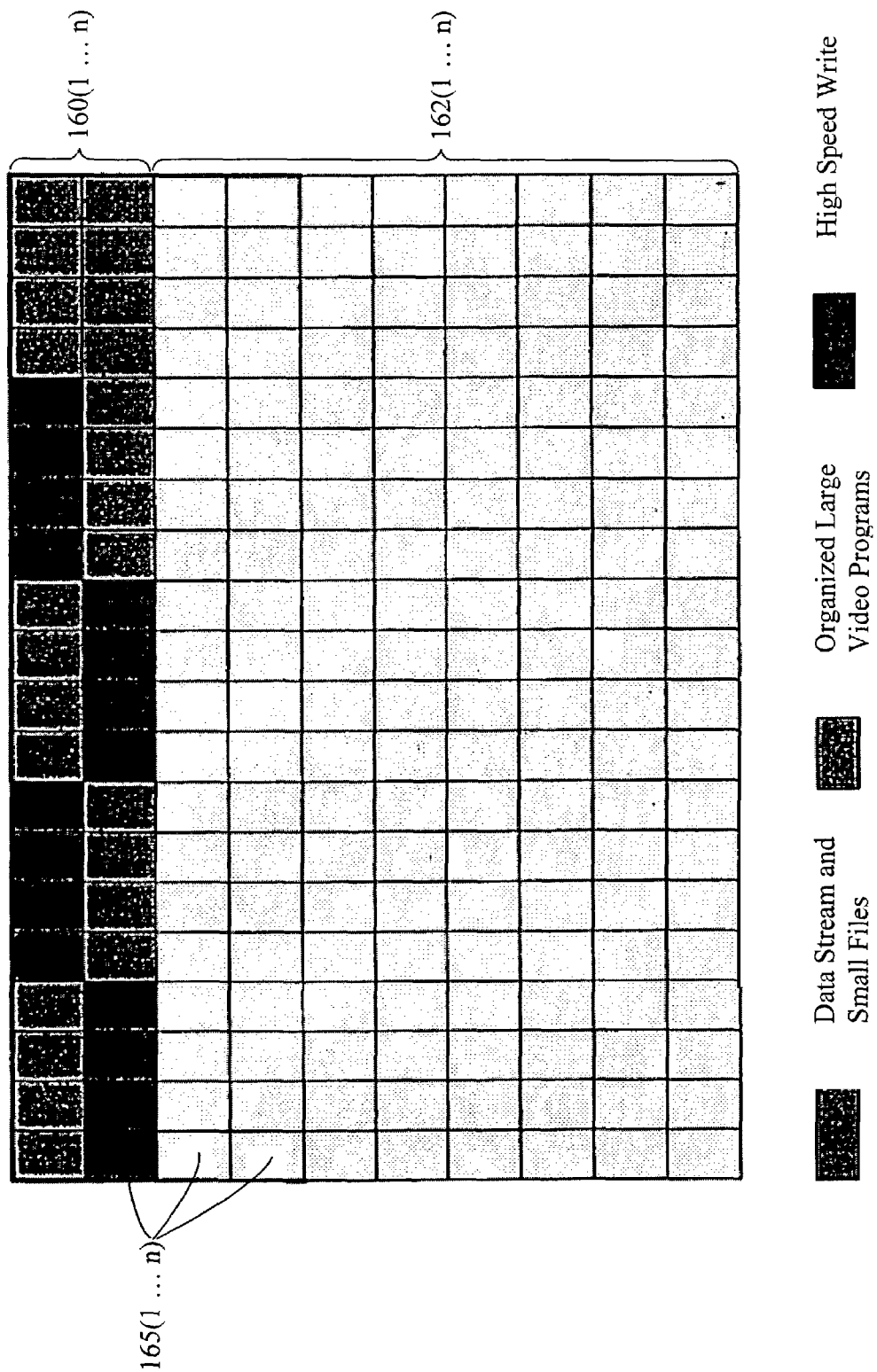
FIG. 6 is a simplified schematic diagram illustrating detailed memory allocation of a hard disk according to one exemplary embodiment of the present invention.

FIG. 6 is a simplified schematic diagram illustrating detailed memory allocation of a hard disk according to one exemplary embodiment of the present invention. There is shown a representative portion of the hard disk 150 which includes high-speed zones 160(1 . . . n) and random-access zones 162(1 . . . n). The hard disk 150 is made up of memory blocks 165. More specifically, memory blocks representing the high-speed zones 160 are grouped together in a contiguous manner; and memory blocks representing the random-access zones 162 are also grouped together in a contiguous manner but separated from the memory blocks representing the high-speed zones 160.

Figure 7:
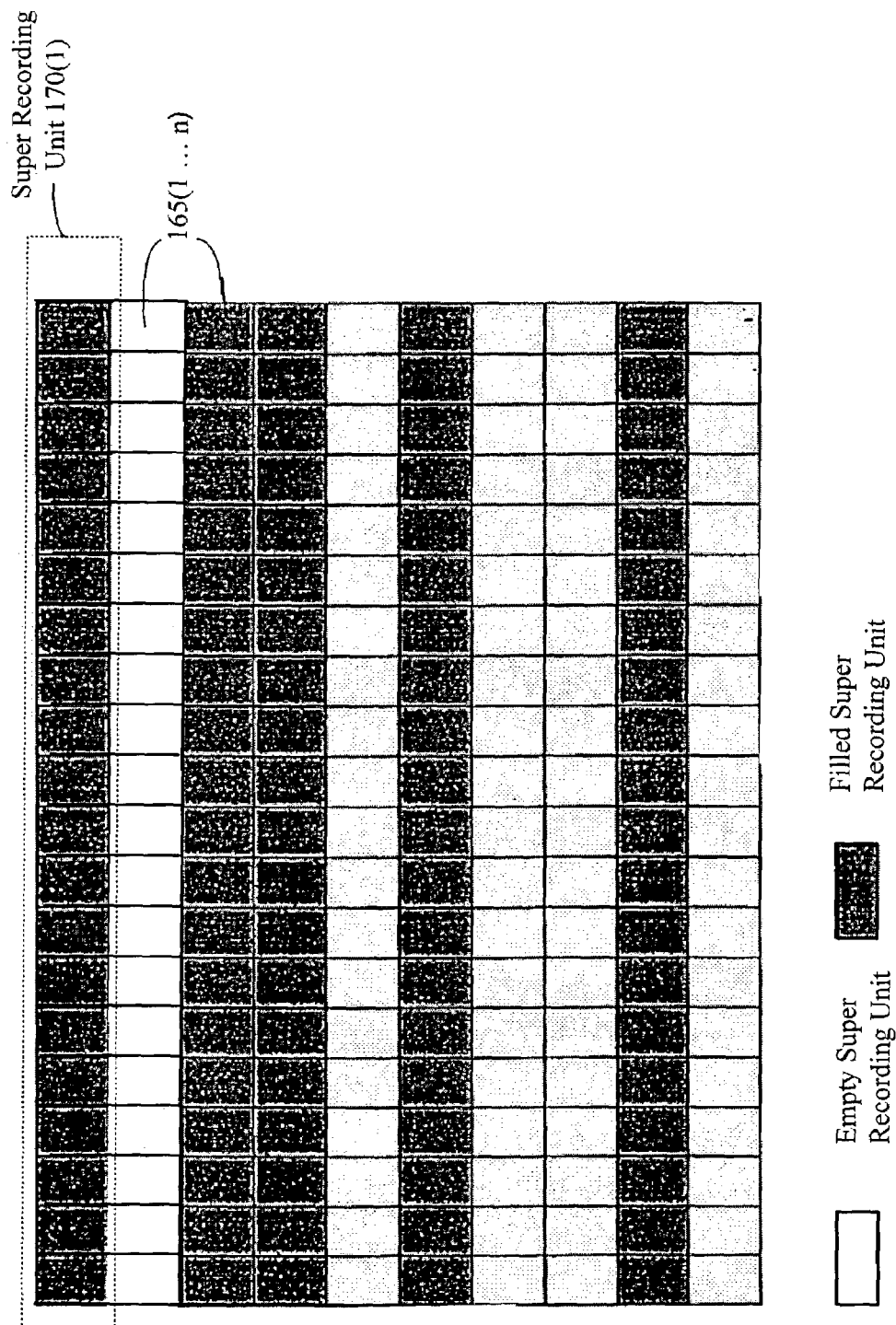
FIG. 7 is a simplified schematic diagram illustrating detailed memory allocation of a hard disk according to another exemplary embodiment of the present invention.

FIG. 7 is a simplified schematic diagram illustrating detail memory allocation of a hard disk according to another exemplary embodiment of the present invention. There is shown a representative portion of the hard disk 150 which includes a number of storage units. In some embodiments, hard disk 150 has three different types of storage units: superrecording units 170(1 . . . n), recording block units 165(1 . . . n), and basic units (not demarcated). One or more super-recording units 170 are used to implement the high-speed zones 160. Each super-recording unit 170(1 . . . n) can include one or more recording block units 165(1 ... n). Preferably, all the recording block units in a super-recording unit 170 are physically located close to or contiguous with each other. Each recording block unit 165 includes many basic units. For example, one recording block unit 165 can contain two hundred and fifty-six (256) basic units. Each basic unit can vary in size, e.g., five hundred and twelve (512) bytes, the size of a conventional sector in a hard disk.

It can be seen that the present invention in the form of one or more exemplary embodiments as described above provide a number of advantages and/or benefits. Principally, the present invention allows high-speed access and recording of multiple content streams of data. The present invention can be deployed in a number of applications. For example, the present invention can be used in a personal video recording system to provide better system performance. A person of ordinary skill in the art will appreciate how to deploy or use the present invention in other contexts and/or applications.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for facilitating high-speed access and recording of multiple content streams, comprising:

a buffer memory configured to store respective contents from one or more content streams, wherein the contents include at least one video program of finite temporal length; and a hard disk configured to store the respective contents from the one or more content streams stored in the buffer memory and including a high-speed zone and a random-access zone, wherein:

in a high-speed mode, the contents stored in the buffer memory are transferred to the high-speed zone wherein zone units of the high-speed zone are filled sequentially, in a random access mode, the contents stored in the buffer memory are transferred to the random-access zone, in a buffer-cleaning mode, the contents stored in the high-speed zone are transferred to the random-access zone if a predetermined period of time has elapsed, and the contents stored in the buffer memory are transferred to the hard disk for storage if a capacity threshold of the buffer memory is reached.

2. The system of claim 1 wherein contents from the hard disk are loaded into the buffer memory pursuant to an access request requesting contents; wherein the contents loaded into the buffer memory include the contents requested by the access request and additional contents related to the contents requested by the access request; and wherein the additional contents are loaded into the buffer memory in anticipation of a subsequent access request.

3. The system of claim 2 wherein the subsequent access request is satisfied by the additional contents stored in the buffer memory thereby reducing access to the hard disk.

4. The system of claim 1 wherein the buffer memory further comprises a plurality of service units;

wherein at least one content stream is associated with a first service group having one or more service units and the at least one content stream is associated with the one or more service units; and wherein in a write operation, the one or more service units within the first service group are filled in a first sequential order with contents from the at least one content stream, and contents from the filled one or more service units are transferred to the hard disk in the first sequential order.

5. The system of claim 4 wherein at least one of the plurality of service units includes a plurality of sub-units; and wherein in the write operation, the plurality of sub-units are filled in a second sequential order with the contents from the associated content stream, and contents from the filled sub-units are transferred to the hard disk in the second sequential order.

6. The system of claim 4 wherein at least one content stream is associated with a second service group having one or more service units; and wherein in a read operation, the one or more service units within the second service group are filled in a second sequential order with contents from the hard disk.

7. The system of claim 1 wherein in the high-speed mode, the contents transferred to the high-speed zone are stored in close proximity to each other or in a contiguous manner.

8. The system of claim 1 wherein the random-access zone includes a plurality of sub-zones, each sub-zone configured to store contents matching a specified criterion; and wherein in the random access mode, the contents transferred from the buffer memory to the random-access zone are examined and respectively forwarded to the corresponding sub-zones for storage based on the specified criteria of the plurality of sub-zones.

9. The system of claim 8 wherein in the buffer-cleaning mode, the contents transferred from the high-speed zone to the random-access zone are examined and respectively forwarded to the corresponding sub-zones for storage based on the specified criteria of the plurality of sub-zones.

10. A personal video recording system incorporating the system as recited in claim 1.

11. A system for facilitating high-speed access and recording of multiple content streams, comprising:

a storage medium configured to receive and store respective contents from one or more content streams, the storage medium having a plurality of zones including a high-speed zone and a random-access zone, and the contents including at least one video program of finite temporal length;

wherein in a high-speed mode, the respective contents from the one or more content streams are directed to the high-speed zone for storage and zone units of the high-speed zone are filled sequentially;

wherein in a random-access mode, the respective contents from the one or more content streams are directed to the random-access zone for storage; and wherein in a buffer-cleaning mode, the contents stored in the high-speed zone are transferred to the random-access zone if a predetermined period of time has elapsed.

12. The system of claim 11 wherein in the high-speed mode, the respective contents from the one or more content streams are stored in close proximity to each other or in a contiguous manner in the high-speed zone.

13. The system of claim 11 wherein the random-access zone includes a plurality of sub-zones, each sub-zone configured to store contents matching a specified criterion; and wherein in the random access mode, the respective contents from the one or more content streams are examined and respectively forwarded to the corresponding sub-zones for storage based on the specified criteria of the plurality of sub-zones.

14. The system of claim 13 wherein in the buffer-cleaning mode, the contents transferred from the high-speed zone to the random-access zone are examined and respectively forwarded to the corresponding sub-zones for storage based on the specified criteria of the plurality of sub-zones.

15. The system of claim 11 wherein the storage medium is a hard disk.

16. A personal video recording system incorporating the system as recited in claim 11.

17. The system of claim 11 further comprising:

a buffer memory configured to store the respective contents from the one or more content streams;

wherein the contents stored in the buffer memory are transferred to the storage medium for storage when a predetermined condition is met.

18. The system of claim 17 wherein the predetermined condition includes a situation where capacity threshold of the buffer memory is reached.

19. The system of claim 17 wherein contents from the storage medium are loaded into the buffer memory pursuant to an access request requesting contents;

wherein the contents loaded into the buffer memory include the contents requested by the access request and additional contents related to the contents requested by the access request; and wherein the additional contents are loaded into the buffer memory in anticipation of a subsequent access request.

20. The system of claim 19 wherein the subsequent access request is satisfied by the additional contents stored in the buffer memory thereby reducing access to the storage medium.

21. The system of claim 17 wherein the buffer memory further comprises a plurality of service units;
wherein at least one content stream is associated with a first service group having one or more service units and the at least one content stream is associated with the one or more service units;
wherein in a write operation, the one or more service units within the first service group are filled in a first sequential order with contents from the at least one content stream, and contents from the filled one or more service units are transferred to the storage medium in the first sequential order.

22. The system of claim 21 wherein at least one of the plurality of service units includes a plurality of sub-units; and
wherein in the write operation, the plurality of sub-units are filled in a second sequential order with the contents from the associated content stream, and contents from the filled sub-units are transferred to the storage medium in the second sequential order.

23. The system of claim 21 wherein at least one content stream is associated with a second service group having one or more service units; and
wherein in a read operation, the one or more service units within the second service group are filled in a second sequential order with contents from the storage medium.

24. A method for facilitating high-speed access and recording of multiple content streams, comprising:
storing respective contents from one or more content streams in a buffer memory, wherein the contents include at least one video program of finite temporal length;
transferring the respective contents from the one or more content streams to a hard disk when a capacity threshold of the buffer memory is reached;
configuring the hard disk to include a high-speed zone and a random-access zone;
transferring the contents stored in the buffer memory to the high-speed zone if the hard drive is in a high-speed mode, wherein zone units of the high-speed zone are filled sequentially;
transferring the contents stored in the buffer memory to the random-access zone if the hard disk is in a random access mode; and
transferring the contents stored in the high-speed zone to the random-access zone if the hard disk is in a buffer-cleaning mode and if a predetermined period of time has elapsed.

25. The method of claim 24 further comprising:
loading contents from the hard disk into the buffer memory pursuant to an access request requesting contents;
wherein the contents loaded into the buffer memory include the contents requested by the access request and additional contents related to the contents requested by the access request; and
wherein the additional contents are loaded into the buffer memory in anticipation of a subsequent access request.

26. The method of claim 25 further comprising:
satisfying the subsequent access request using the additional contents loaded into the buffer memory thereby reducing access to the hard disk.

27. The method of claim 24 wherein the buffer memory further comprises a plurality of service units and the method further comprises:
assigning a first service group having one or more service units to at least one content stream, wherein the at least one content stream is associated with the first service group and the one or more service units; and
when in a write operation, filling the one or more service units within the first service group in a first sequential order with contents from the at least one content stream, and transferring contents of the filled one or more service units to the hard disk in the first sequential order.

28. The method of claim 27 wherein at least one of the plurality of service units includes a plurality of sub-units and the method further comprises:
when in the write operation, filling the plurality of sub-units in a second sequential order with the contents from the corresponding content stream, and transferring contents from the filled sub-units to the hard disk in the second sequential order.

29. The method of claim 27 further comprising:
assigning a second service group having-one or more service units to at least one content stream; and
when in a read operation, filling the one or one service units within the second service group in a second sequential order with contents from the hard disk.

30. The method of claim 24 wherein in the high-speed mode, the contents transferred to the high-speed zone are stored in close proximity to each other or in a contiguous manner.

31. The method of claim 24 further comprising:
dividing the random-access zone into a plurality of sub-zones, each sub-zone configured to store contents matching a specified criterion;
when in the random access mode, forwarding the contents transferred from the buffer memory to the random-access zone respectively to the corresponding sub-zones for storage based on the specified criteria of the plurality of sub-zones.

32. The method of claim 31 further comprising:
when in the buffer-cleaning mode, forwarding the contents transferred from the high-speed zone to the random-access zone respectively to the corresponding sub-zones for storage based on the specified criteria of the plurality of sub-zones.

33. A personal video recording system utilizing the method as recited in claim 24.

34. A method for facilitating high-speed access and recording of multiple content streams, comprising:
dividing a storage medium into a plurality of zones including a high-speed zone and a random-access zone;
storing respective contents from one or more content streams in a buffer memory, wherein the contents include at least one video program of finite temporal length;
when in a high-speed mode, storing the respective contents from the one or more content streams that are in the buffer memory in the high-speed zone, wherein zone units of the high-speed zone are filled sequentially;
when in a random-access mode, storing the respective contents from the one or more content streams that are in the buffer memory in the random-access zone; and
when in a buffer-cleaning mode, if a select predetermined period of time has elapsed, transferring the contents stored in the high-speed zone to the random-access zone.

35. The method of claim 34 wherein in the high-speed mode, the respective contents from the one or more content streams are stored in close proximity to each other or in a contiguous manner in the high-speed zone.

36. The method of claim 34 further comprising:
dividing the random-access zone into a plurality of sub-zones, each sub-zone configured to store contents matching a specified criterion;
when in the random access mode, forwarding the respective contents from the one or more content streams respectively to the corresponding sub-zones for storage based on the specified criteria of the plurality of sub-zones.

37. The method of claim 36 further comprising:
when in the buffer-cleaning mode, forwarding the contents transferred from the high-speed zone to the random-access zone respectively to the corresponding sub-zones for storage based on the specified criteria of the plurality of sub-zones.

38. The method of claim 34 wherein the storage medium is a hard disk.

39. A personal video recording system utilizing the method as recited in claim 36.

40. The method of claim 34 further comprising:
storing the respective contents from the one or more content streams in an buffer memory; and
transferring the contents stored in the buffer memory to the storage medium when a predetermined condition is met.

41. The method of claim 40 wherein the predetermined condition includes a situation where a capacity threshold of the buffer memory is reached.

42. The method of claim 40 further comprising:
loading contents from the storage medium into the buffer memory pursuant to an access request requesting contents;
wherein the contents loaded into the buffer memory include the contents requested by the access request and additional contents related to the contents requested by the access request; and
wherein the additional contents are loaded into the buffer memory in anticipation of a subsequent access request.

43. The method of claim 42 further comprising:
satisfying the subsequent access request using the additional contents stored in the buffer memory thereby reducing access to the storage medium.

44. The method of claim 40 wherein the buffer memory further comprises a plurality of service units and the method further comprises:
assigning a first service group having one or more service units to at least one content stream, wherein the at least one content stream is associated with the first service group and the one or more service units;
when in a write operation, filling the one or more service units within the first service group in a first sequential order with contents from the at least one content stream, and transferring contents from the filled one or more service units to the storage medium in the first sequential order.

45. The method of claim 44 wherein at least one of the plurality of service units includes a plurality of sub-units and the method further comprises:
when in the write operation, filling the plurality of sub-units in a second sequential order with the contents from the associated content stream, and transferring contents from the filled sub-units to the storage medium in the second sequential order.

46. The method of claim 44 further comprising:
assigning a second service group having one or more service units to at least one content stream; and
when in a read operation, filling the one or more service units within the second service group in a second sequential order with contents from the storage medium.

* * * * *